(12) United States Patent
McGarry et al.

(10) Patent No.: US 8,456,623 B2
(45) Date of Patent: Jun. 4, 2013

(54) OPTICAL COMPONENT FOCUS TESTING APPARATUS AND METHOD

(75) Inventors: Colin McGarry, Broxburn (GB); Gilles Dufaure De Lajarte, Munich (DE)

(73) Assignee: STMicroelectronics (Research & Development) Ltd., Marlow, Buckinghamshire (GB)

( * ) Notice: Subject to any disclaimer, the term of this patent is extended or adjusted under 35 U.S.C. 154(b) by 502 days.

(21) Appl. No.: 12/604,253

(22) Filed: Oct. 22, 2009

(65) Prior Publication Data

US 2010/0188653 A1    Jul. 29, 2010

(30) Foreign Application Priority Data

Nov. 25, 2008 (GB) .................................. 0821503.0

(51) Int. Cl.
*G01B 9/00* (2006.01)
(52) U.S. Cl.
USPC .......................................... 356/125; 356/124
(58) Field of Classification Search
USPC ........... 356/124–127, 213–218, 237.1–237.5; 348/187, 92, 189, 190, 192, 61
See application file for complete search history.

(56) References Cited

U.S. PATENT DOCUMENTS

| | | | | |
|---|---|---|---|---|
| 3,904,294 A | * | 9/1975 | Gold et al. | 356/124.5 |
| 5,664,243 A | * | 9/1997 | Okada et al. | 396/246 |
| 2005/0162517 A1 | | 7/2005 | Fujihara et al. | |

FOREIGN PATENT DOCUMENTS

| | | |
|---|---|---|
| EP | 1 628 123 A1 | 2/2006 |
| GB | 2 420 239 A | 5/2006 |
| GB | 2 426 813 A | 12/2006 |
| WO | WO-2005/047846 A1 | 5/2005 |

OTHER PUBLICATIONS

Search Report for GB0821503.0, Mar. 18, 2009, 4 pages.

* cited by examiner

*Primary Examiner* — Tri T Ton
(74) *Attorney, Agent, or Firm* — Gardere Wynne Sewell LLP

(57) ABSTRACT

An optical component focus testing apparatus includes a plurality of test pattern displays. One or more illuminators are configured to selectively illuminate different test pattern displays at different times. Light directors are provided to direct light from at least one of the illuminated test pattern displays towards an optical component under test. The light directors and test pattern displays are arranged such that, in use, light directed from different illuminated test pattern displays travel different distances to reach the optical component under test.

31 Claims, 5 Drawing Sheets

OPTICAL COMPONENT FOCUS TESTING APPARATUS AND METHOD

PRIORITY CLAIM

This application claims priority from British Patent Application No. 0821503.0 filed Nov. 25, 2008, the disclosure of which is hereby incorporated by reference.

FIELD OF THE INVENTION

The present invention relates to an optical component focus testing apparatus and method; particularly, but not exclusively, the present invention relates to an apparatus and method for testing the focus of a camera.

BACKGROUND OF THE INVENTION

Figure 1:
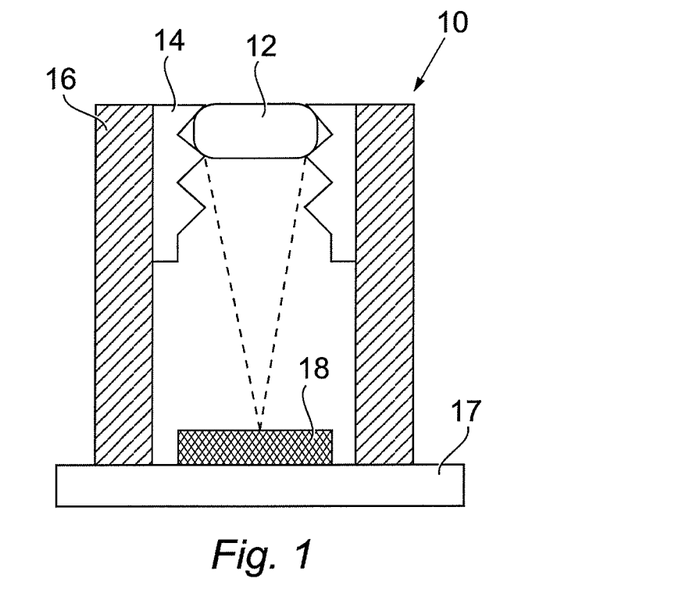
FIG. 1 is a cross section through a conventional camera.

Referring to FIG. 1, a conventional camera 10 typically comprises a lens 12 mounted between a threaded arrangement 14 disposed in a plastic mount 16. The mount 16 is mounted at one end on a PCB board 17 and a semiconductor photosensor 18 (e.g. charge-coupled device CCD or photodiode or CMOS, linear or area imaging array) is mounted in turn on the PCB board 17 at a location enclosed by the mount 16. In use, the position of the lens 12 relative to the photosensor 18 is adjusted (by adjusting the position of the threaded arrangement 14) to cause light travelling through the lens 12 to be focused on the photosensor 18.

Figure 2:
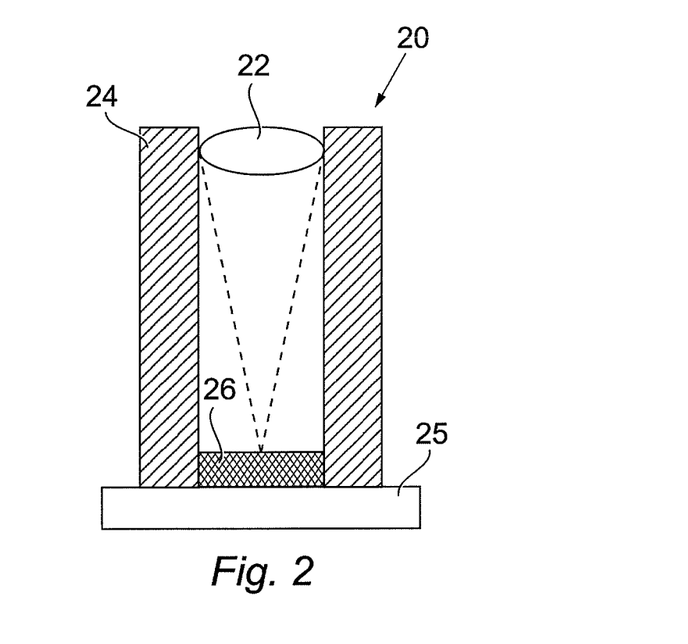
FIG. 2 is a cross section through a no-focus camera.

Recent years have seen the inclusion of cameras into handheld personal devices (e.g. mobile phones). At the same time, intense price competition has led to a drive to reduce the cost of cameras, by reducing the number of components therein. This has resulted in the development of the "no-focus" or "focus-free" camera. Referring to FIG. 2, a no-focus camera 20 comprises a lens 22, mount 24 (mounted on a PCB board 25) and semiconductor photosensor 26 (in a similar fashion to the conventional camera depicted in FIG. 1). However, the lens 22 is directly mounted and/or bonded to the mount 24, without the inclusion of a threaded arrangement therebetween. In this case, it is no longer possible to move the lens in the mount to focus light onto the photosensor 26. Accordingly, it is necessary to manufacture the lens with a very precise (i.e. with very low tolerances) predefined focus, so that when the components of the no-focus camera are assembled, the lens precisely focuses light on the photosensor.

There exists a need in the art for determining whether the lens in a no-focus camera like that of FIG. 2, or of other types of camera, is correctly focused. Similarly, there is a need in the art for a useful mechanism to determine the distance at which the camera is focused.

SUMMARY

In accordance with a first aspect, there is provided an optical component focus testing apparatus comprising a plurality of test pattern displays arranged such that, in use, light directed from different test pattern displays travels different distances to reach the optical component under test.

In an embodiment, an optical component focus testing apparatus comprises a plurality of test pattern display means; a one or more illumination means configurable to switchably illuminate different test pattern display means at different times; a one or more light directing means configured, in use, to direct light reflected from at least one of the illuminated test pattern display means towards an optical component under test; wherein the light directing means and test pattern display means are arranged such that, in use, light directed from different illuminated test pattern display means travel different distances to reach the optical component under test.

According to a second aspect there is provided a no-focus camera testing apparatus comprising the optical component focus testing apparatus of the first aspect.

According to a third aspect there is provided a method of testing the focus of an optical component comprising: providing a plurality of test pattern display means; providing a one or more illumination means to switchably illuminate different test pattern display means at different times; directing light reflected from at least one of the illuminated test pattern display means towards an optical component under test; wherein directing light reflected from at least one of the illuminated test pattern display means comprises directing light so that light reflected from different illuminated test pattern display means travel different distances to reach the optical component.

According to a fourth aspect there is provided a method of testing a no-focus camera comprising the steps of executing described above.

BRIEF DESCRIPTION OF THE DRAWINGS

An embodiment of the invention is herein described by way of example only with reference to the accompanying Figures in which.

DETAILED DESCRIPTION OF THE DRAWINGS

Figure 3:
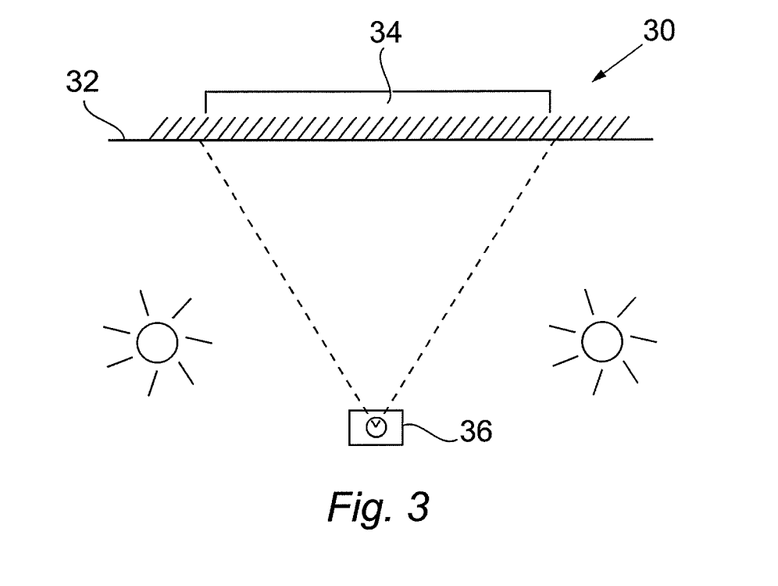
FIG. 3 is a block diagram of a prior art test rig for a conventional camera.

Referring to FIG. 3, a test apparatus for a conventional camera typically comprises a test rig 30, wherein a chart 32 is positioned in the field of view 34 of a camera 36 under test. The chart 32 typically comprises a plurality of stripes (e.g. black on a white background) located at different positions thereon (e.g. in the corners and center of the chart). The degree of focus of the camera is measured, for example, by assessing the apparent rate of change of light level between the dark and light areas of the chart as detected by the camera. For example, referring to FIG. 1, when assessing a modulation transfer function of a conventional camera 10, the mount 16 is rotated about the lens 12 to determine the degree of sharpness detected by the camera 10 as a function of the rotational angle (or distance of the lens 12 from the chart).

However, referring to FIG. 2, with a no-focus camera 20, it is not possible to move the lens 22. Thus, it is not possible to determine the variation in modulation transfer function with respect to rotational angle (or distance of the lens from the chart). However, using a single chart at a fixed distance from the camera under test makes it difficult to determine whether the lens is short focused, long focused, or of bad quality. To overcome this problem, a prior art test apparatus for a no-focus camera comprises a plurality of charts positioned at different distances relative to the camera. The charts are individually and sequentially slid into the field of view of the camera. However, this is a cumbersome and time-consuming process, which is not amenable to quick decision-making regarding the desired location of the defocus of a no-focus camera.

The preferred embodiment provides a mechanism for testing a camera with charts at various distances from the camera lens, wherein the preferred embodiment has a fixed test set up (i.e. with no moving parts). Broadly speaking, the preferred embodiment comprises a mounting system which positions a camera (which need not necessarily be fully assembled with all its components) so that it is facing a plurality of charts. The mounting system is further provided with a plurality of independently controllable illumination sources, which light each chart. Furthermore, the preferred embodiment comprises a one or more beamsplitters that direct the light reflected from the charts to the camera.

The mounting system positions each chart at a fixed distance from the camera. More particularly, the charts are positioned at different distances (relative to each other) from the camera. A first chart is positioned closer to the camera than the camera's design focus distance. A second chart is spaced from the camera by its design focus distance; and a third chart is spaced from the camera at a distance larger than its design focus distance. The preferred embodiment comprises a control system, which enables a particular chart to be selected for viewing by the camera. More particularly, the choice of viewed chart is enabled by independently switching on/off the light sources, wherein the beamsplitters permit only the illuminated chart to be seen by the camera. The focus or image sharpness of the camera may be determined with any of several available methods (e.g. modulation transfer function (MTF), contrast transfer function (CTF), point spread function (PSF) etc.)

Figure 4:
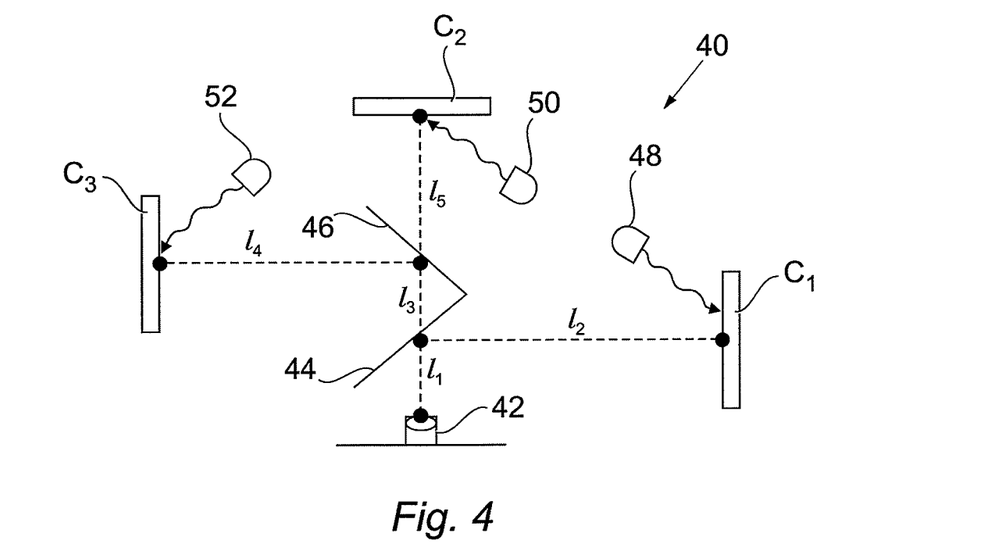
FIG. 4 is a block diagram of the camera focus testing apparatus of the preferred embodiment.

Referring to FIG. 4, an example of the preferred embodiment comprises a mounting system 40, which is configured to house a camera 42 under test. In the present example, the mounting system 40 further comprises three charts $C_1$, $C_2$ and $C_3$ and first and second beamsplitters 44, 46. However, it will be appreciated that in other implementations, more or less beamsplitters may be used, depending on the number of image distances required for the test. The beamsplitters may be spectrally neutral, and may have varying transmission/reception characteristics to maintain scene luminance for each chart.

The beamsplitters 44 and 46 are disposed at angles to each other, and the first beamsplitter 44 is disposed more proximal to the camera 42 than the second beamsplitter 46. Similarly, the mounting system 40 comprises three lamps 48, 50 and 52. Of course, it will be appreciated that in other implementations, different numbers of lamps may be used. The lamps are arranged so that light from lamp 48 falls on chart $C_1$, light from lamp 50 falls on chart $C_2$ and light from lamp 52 falls on chart $C_3$. As an alternative to varying the transmission/reception characteristics of the beamsplitters, other implementations of the preferred embodiment may include a mechanism wherein each lamp is of a different brightness to maintain scene luminance for each chart.

The charts are arranged such that light (from lamp 48) reflected from chart $C_1$ must travel a distance $l_2$ to reach beamsplitter 44. The light is reflected by the beamsplitter 44 to travel a distance $l_1$ before reaching the camera 42 under test. Thus, light reflected from chart $C_1$ must follow a path of length $D_1=l_1+l_2$ to reach the camera 42 under test.

Similarly, light (from lamp 50) reflected from chart $C_2$ must travel a distance $l_5$ to reach beamsplitter 46. The light is reflected by the beamsplitter 46 to travel a distance $l_3$ before reaching beamsplitter 44. As with the light from chart $C_1$, the light from beamsplitter 46 is reflected from beamsplitter 44, to travel a distance $l_1$ before reaching the camera 42 under test. Thus, light reflected from chart $C_2$ must follow a path of length $D_2=l_5+l_3+l_1$ to reach the camera 42 under test.

Finally, light (from lamp 52) reflected from chart $C_3$ must travel a distance $l_4$ to reach beamsplitter 46. The light is reflected by the beamsplitter 46 to travel a distance $l_3$ before reaching beamsplitter 44. As with the light from chart $C_1$, the light from beamsplitter 46 is reflected from beamsplitter 44, to travel a distance $l_1$ before reaching the camera 42 under test. Thus, light reflected from chart $C_3$ must follow a path of length $D_3=l_4+l_3+l_1$ to reach the camera 42 under test.

Figure 5:
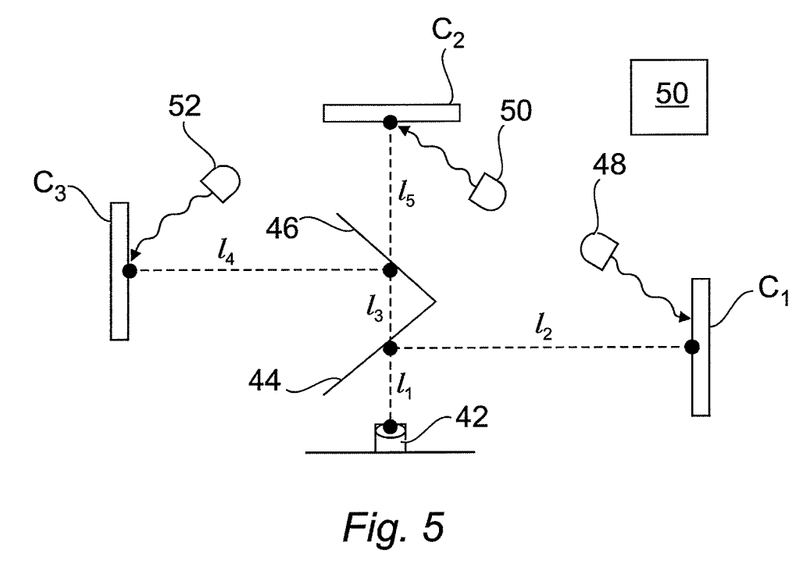
FIG. 5 shows the camera focus testing apparatus of FIG. 4, provided with an adjusting mechanism that sets or adjusts the positions of test pattern displays and/or light directors with respect to a camera under test.

The positions of the charts $C_1$-$C_3$ and/or beamsplitters 44, 46 with respect to the camera 42 under test (and thus, the distances $l_1$ to $l_5$) may be independently set or adjusted by an adjusting mechanism, shown generally in FIG. 5 as adjusting mechanism 50. The adjusting mechanism may be operatively connected to one or more of the charts C1-C3 and/or to one or more of the beamsplitters 44, 46. The adjusting mechanism may comprise any suitable actuators and mechanical connections as are well known to a person skilled in the art. It is to be appreciated that the adjusting mechanism may be used to position the charts C1-C3 and/or beamsplitters 44, 46 to a desired configuration, which can then remain fixed during a method of testing the focus of an optical component.

Also, the lamps 48-52 may be independently controlled by a controlling system so that the lamps 48-52 may be independently switched on or off. A controlling system 60 is shown generally in FIG. 6, and in a preferred embodiment comprises a control connection to each of the lamps. More particularly, the lighting may be quickly switched between each chart $C_1$-$C_3$ in turn.

Figure 6:
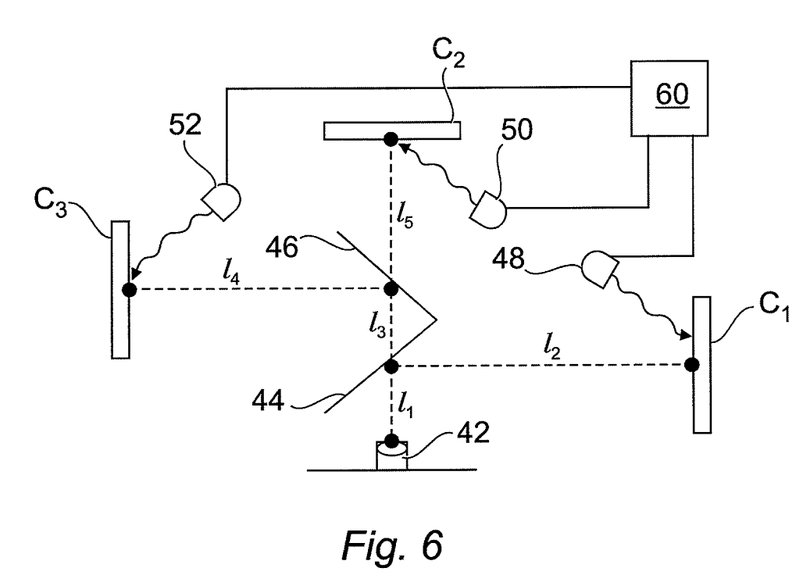
FIG. 6 shows the camera focus testing apparatus of FIG. 4, provided with a controlling system for switching the illuminators.

In one embodiment, a camera focus testing apparatus may be provided that comprises both the controlling system 60 shown in FIG. 6 and the adjusting mechanism 50 shown in FIG. 5.

Figure 7:
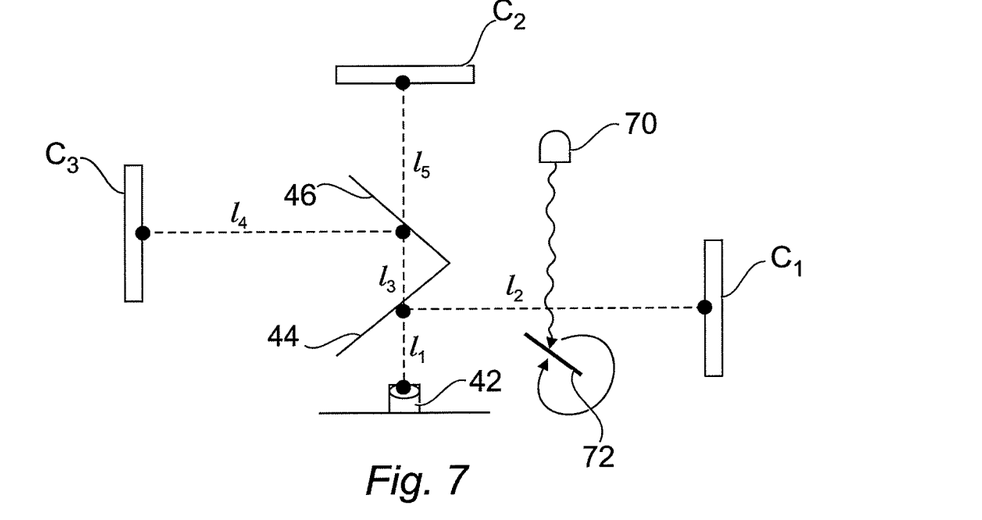
FIG. 7 shows a camera focus testing apparatus comprising an adjustable light director.

Another implementation is shown in FIG. 7. Instead of using multiple lamps, a single lamp 70 may be used with a rotatable mirror 72 (or other light directing mechanism) whose rotation is controllable to shine light from the lamp on the different charts $C_1$-$C_3$. This approach may be useful in a low-power application. While it is recognized that it introduces a moving part (i.e. the mirror 72) into the apparatus, nonetheless, it is still considerably less cumbersome and time consuming than the above-mentioned prior art approach.

In use, the camera 42 under test may see any one of the charts $C_1$-$C_3$ at the above-mentioned viewing distances and the charts can be backlit or frontlit depending on their construction (opaque or translucent types). The beamsplitters 44, 46 effectively restrict the light reaching the camera 42, so that the camera 42 is only permitted to see one illuminated chart.

With this arrangement, the lengths $D_1$-$D_3$ (of the light paths from the charts $C_1$-$C_3$ to the camera 42) represent three differing image distances, which could be 'less than design nominal', 'design nominal', and 'greater than design nominal'.

The term "design nominal" refers in general to a predetermined intended value of a characteristic of a component. For example, a component may be manufactured with the intention of possessing specific dimensions, or physical characteristics such as a permittivity or a density of a specific value. The term "design nominal" can sometimes be used as a parameter by which the performance of different components can be compared. In the example of a lens, a "design nominal" can be a focal length. That is, a lens will be manufactured to a specification that is intended to produce a specific desired focal length. Lenses can be chosen for specific applications based on their focal length (and/or on the basis of other characteristic values). The manufacturing process may however be flawed and the specific desired focal length may not be achieved in all cases. The actual focal length can then be compared to the design nominal focal length in a test procedure that verifies the properties of the lens.

For example, if a camera is intended to focus at 50 cm, and achieves peak MTF at 25 cm, it can be said to focus closer than design nominal. However, it will be realized that the light path lengths could be set at other distances.

Analysis of the image sharpness detected by the camera 42, allows judgment of where the camera 42 is best focused. Since, the lamps 48-52 may be very rapidly switched on or off (by the control mechanism), the camera is effectively rapidly exposed to views of charts at different distances therefrom (without the necessity of moving the camera or the charts). Accordingly, the preferred embodiment provides a cheap and fast way of determining where a best focus position is relative to an 'as built' focus position. Bearing in mind that, the lens is built with an error in best focus position from its design optimum, and the degree of error (as built) can be determined from the design intent.

Baffles may be provided to ensure minimal light spillage from the illuminated chart and the non-illuminated charts. These are shown as baffles 80, 82, 84 and 86 in FIG. 8. It will be appreciated that more of fewer baffles may be provided; and that the baffles can be provided with any of the embodiments illustrated in FIGS. 4 to 9, or variations thereof.

Figure 9:
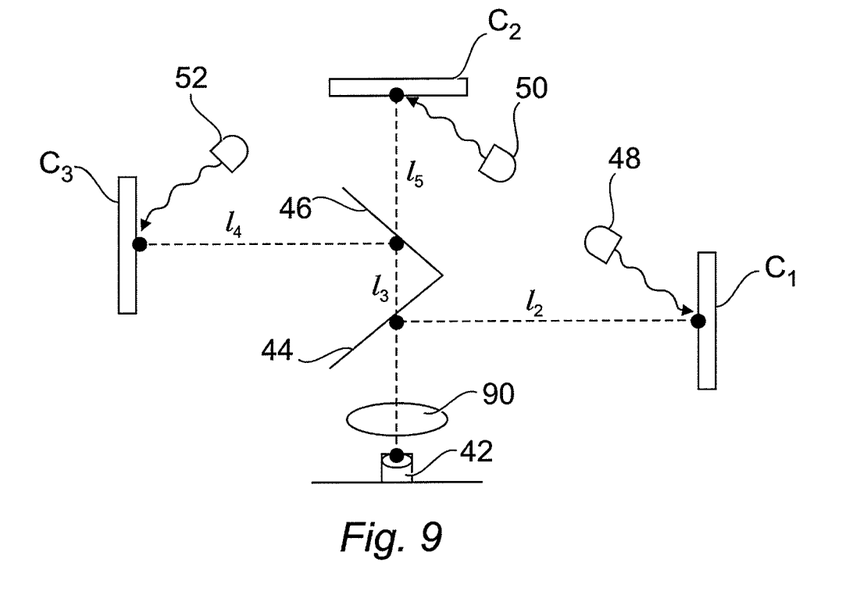
FIG. 9 shows the camera focus testing apparatus of FIG. 4, provided with an image correction lens.

An image distance correction lens may be fixed in front of the camera to scale large image distances to a more compact arrangement. This is shown in FIG. 9 as image correction lens 90. It will be appreciated that the image correction lens can be provided with any of the embodiments illustrated in FIGS. 4 to 9, or variations thereof.

Figure 10:
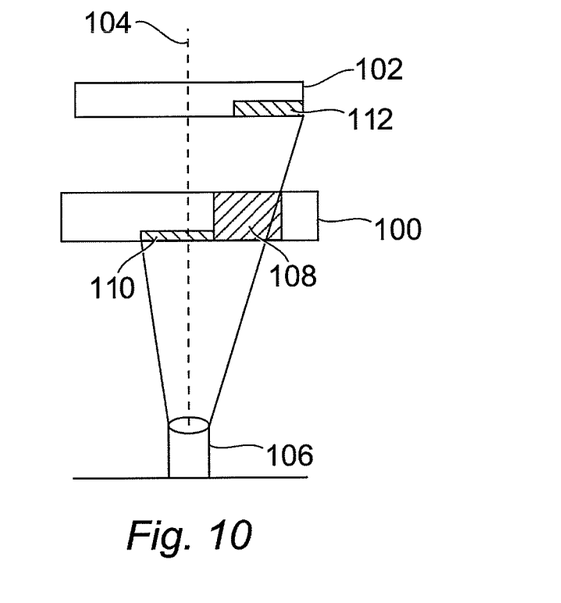
FIG. 10 shows a camera focus testing apparatus of an alternative embodiment.

An alternative embodiment camera focus testing apparatus is shown in FIG. 10. Here, a first test pattern display 100 and a second test pattern display 102 are provided. The test pattern displays may take the form of charts, as in the other example embodiments discussed above.

The two displays 100, 102 are provided in an overlapping arrangement along an optical path 104 of a component under test 106. However, the first display 100 comprises a portion 108 that is at least partially transparent. This allows the pattern on the second display 82102 to be imaged by the optical component under test 86106, as light is permitted to pass from through the portion 88108. The light reflected from the displays can be considered as being "directed" towards the optical component under test 86106 by virtue of the arrangement. In the example illustrated, the first display 80100 comprises a portion 90110 that is the area under test, and the second display 82102 comprises a portion 92112 that is a second area under test. Printing of charts can be restricted to these areas 90110, 92112 only if required.

The portion 108 of the first display 80 that is at least partially transparent may in a preferred embodiment comprise an aperture.

It will be appreciated that more than two test pattern displays can be provided if desired. At least each test display that is between the optical component under test and the most distant test display comprise various light transmissive portions, so that different test areas on each test display can be imaged by the optical component under test.

The provision of a plurality of test pattern displays in a fixed arrangement in the field of view of the optical component under test provides a compact structure that enables rapid determination of whether the optical component is short focused, long focused, or of bad quality. Neither the test pattern displays nor the optical component under test need to be moved during a method of testing the focus of the optical component.

Figure 8:
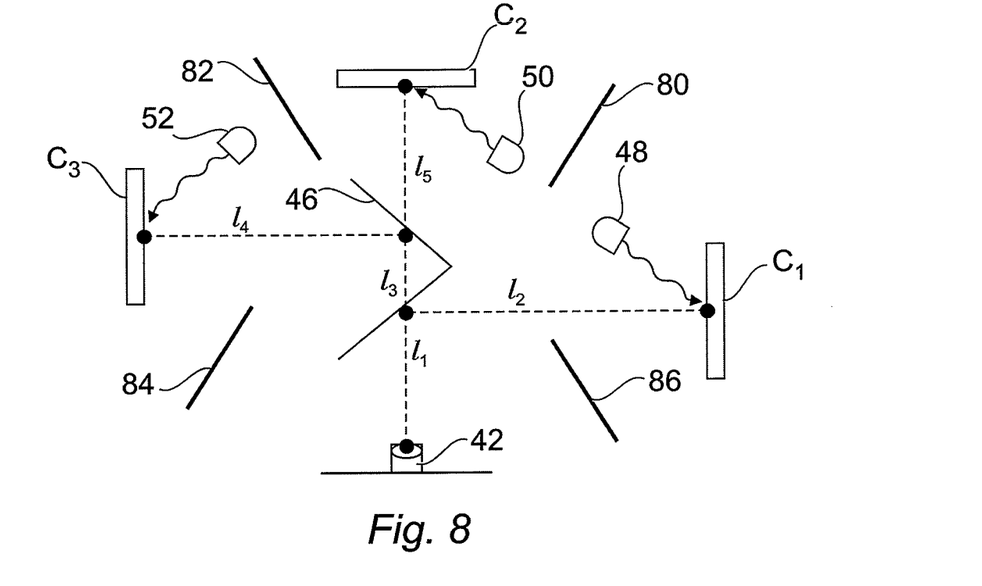
FIG. 8 shows the camera focus testing apparatus of FIG. 4, provided with baffles.

The set up of FIG. 8 is also useful for testing a lens that has two focus positions. In that case, the test displays can be placed at the relevant design nominal focal planes of each focus position.

Modifications and alterations may be made to the above without departing from the scope of the invention.

What is claimed is:

1. An optical component focus testing apparatus, comprising:
   a first test pattern chart;
   a second test pattern chart;
   a first light source configured to selectively illuminate the first test pattern chart at a first time;
   a second light source configured to selectively illuminate the second test pattern chart at a second time; and
   a first beamsplitter positioned such that a first surface of the first beamsplitter directs light from the illuminated first test pattern chart to an optical component under test and a second surface of the first beamsplitter directs light from the illuminated second test pattern chart to the optical component under test;
   wherein the first beamsplitter and first and second test pattern charts are arranged such that light directed from different illuminated test pattern charts travels different distances to reach the optical component under test.

2. The optical component focus testing apparatus of claim 1, further comprising:
   a third test pattern chart;
   a third light source configured to selectively illuminate the third test pattern chart at a third time; and
   a second beamsplitter positioned such that a first surface of the second beamsplitter directs light from the illuminated first test pattern chart to the optical component under test and a second surface of the second beamsplitter directs light from the illuminated third test pattern chart to the optical component under test.

3. The optical component focus testing apparatus of claim 2, wherein a distance light travels from the test pattern charts to the optical component under test is different for each of the first, second and third test pattern charts.

4. The optical component focus testing apparatus of claim 2, wherein the first and second beamsplitters have different transmission characteristics.

5. The optical component focus testing apparatus of claim 2, wherein the first and second beamsplitters have different reflection characteristics.

6. The optical component focus testing apparatus of claim 1, wherein at least one of the distances light travels is a nominal design focus distance for the optical component under test.

7. The optical component focus testing apparatus of claim 1, wherein at least one of the distances light travels is substantially less than a nominal design focus distance for the optical component under test.

8. The optical component focus testing apparatus of claim 1, wherein at least one of the distances light travels is substantially more than a nominal design focus distance for the optical component under test.

9. The optical component focus testing apparatus of claim 1, wherein the first beamsplitter is spectrally neutral.

10. The optical component focus testing apparatus of claim 1, further including a controller operable to switchably activate the first and second light sources.

11. The optical component focus testing apparatus of claim 1, wherein the optical component under test is a camera having a fixed focal length.

12. An optical component focus testing apparatus, comprising:
a first test pattern chart;
a second test pattern chart;
a light illuminator configured to selectively and solely illuminate the first test pattern chart at a first time and selectively and solely illuminate the second test pattern chart at a second time; and
a first beamsplitter positioned such that a first surface of the first beamsplitter directs light from the illuminated first test pattern chart to an optical component under test and a second surface of the first beamsplitter directs light from the illuminated second test pattern chart to the optical component under test;
wherein the first beamsplitter and first and second test pattern charts are arranged such that light directed from different illuminated test pattern charts travels different distances to reach the optical component under test.

13. The optical component focus testing apparatus of claim 12, where the light illuminator comprises: a light source and a rotatable light director configured to direct light from said light source to different ones of the first and second test pattern charts at the first and second times.

14. The optical component focus testing apparatus of claim 12, where the light illuminator comprises:
a first light source;
a second light source; and
a controller operable to switchably activate the first and second light sources to direct light to different ones of the first and second test pattern charts at the first and second times.

15. The optical component focus testing apparatus of claim 12, further comprising:
a third test pattern chart, wherein the light illuminator is further configured to selectively illuminate the third test pattern chart at a third time; and
a second beamsplitter positioned such that a first surface of the second beamsplitter directs light from the illuminated first test pattern chart to the optical component under test and a second surface of the second beamsplitter directs light from the illuminated third test pattern chart to the optical component under test.

16. The optical component focus testing apparatus of claim 15, wherein a distance light travels from the test pattern charts to the optical component under test is different for each of the first, second and third test pattern charts.

17. The optical component focus testing apparatus of claim 15, wherein the first and second beamsplitters have different transmission characteristics.

18. The optical component focus testing apparatus of claim 15, wherein the first and second beamsplitters have different reflection characteristics.

19. The optical component focus testing apparatus of claim 15, wherein at least one of the distances light travels is a nominal focal design distance for the optical component under test.

20. The optical component focus testing apparatus of claim 15, wherein at least one of the distances light travels is substantially less than a nominal focal design distance for the optical component under test.

21. The optical component focus testing apparatus of claim 15, wherein at least one of the distances light travels is substantially more than a nominal focal design distance for the optical component under test.

22. The optical component focus testing apparatus of claim 15, wherein the first beamsplitter is spectrally neutral.

23. The optical component focus testing apparatus of claim 15, wherein the optical component under test is a camera having a fixed focal length.

24. An optical component focus testing method, comprising:
selectively illuminating a first test pattern chart at a first time;
selectively illuminating a second test pattern chart at a second time;
directing light using a first surface of a first beamsplitter from the illuminated first test pattern chart to an optical component under test; and
directing light from a second surface of the first beamsplitter from the illuminated second test pattern chart to the optical component under test;
wherein the first beamsplitter and first and second test pattern charts are arranged such that light directed from different illuminated test pattern charts travels different distances to reach the optical component under test.

25. The optical component focus testing method of claim 24, further comprising:
selectively illuminating a third test pattern chart at a third time;
directing light using a first surface of a second beamsplitter from the illuminated first test pattern chart to the optical component under test; and
directing light from a second surface of the second beamsplitter from the illuminated third test pattern chart to the optical component under test.

26. The optical component focus testing method of claim 25, wherein a distance light travels from the test pattern charts to the optical component under test is different for each of the first, second and third test pattern charts.

27. The optical component focus testing method of claim 24, wherein at least one of the distances light travels is a nominal focus design distance for the optical component under test.

28. The optical component focus testing method of claim 24, wherein at least one of the distances light travels is substantially less than a nominal focus design distance for the optical component under test.

29. The optical component focus testing method of claim 24, wherein at least one of the distances light travels is substantially more than a nominal focus design distance for the optical component under test.

30. The optical component focus testing method of claim 24, wherein the optical component under test is a camera having a fixed focal length.

31. The optical component focus testing method of claim 24, further comprising analyzing a focus of the optical component under test by determining an attribute selected from the group consisting of modulation transfer function, contrast transfer function and point spread function.

\* \* \* \* \*